Patented Mar. 27, 1951

2,546,234

UNITED STATES PATENT OFFICE 2,546,234

CATALYTIC CONVERSION OF HYDROCARBONS

Harry Louis Pelzer, Steger, Ill., assignor to Sinclair Refining Company, New York, N. Y., a corporation of Maine No Drawing. Application June 3, 1947, Serial No. 752,257

4 Claims. (Cl. 196—52)

This invention relates to the pyrolytic conversion of hydrocarbons and, more particularly, to pyrolytic conversion processes in which a catalyst is used and in which the conversion is effected in the vapor phase. The invention provides an improved process for the cracking of heavier hydrocarbons for the production of lighter, lower boiling hydrocarbons, for instance boiling in the motor fuel or gasoline range. The process is also useful in the reforming of naphtha fractions for improving their anti-knock characteristics and lead susceptibility.

Various catalysts have been proposed for use in the conversion of hydrocarbons. The more commonly used catalysts for this purpose are various metals, metal salts, and metal oxides which are solid under the conditions of use and are generally referred to in the art as heterogeneous catalysts. The use of such heterogeneous catalysts in hydrocarbon conversion processes has been accompanied by various conveying and separating problems, as well as the troublesome problem of periodically removing from the catalyst heavy tarry material, or coke, deposited thereon during the conversion reaction.

More recently extensive research has been directed to the discovery of so-called homogeneous catalyst, that is, catalyst which, under reaction conditions, will form a homogeneous mixture with the hydrocarbon oil, or oil vapors, and the development of hydrocarbon conversion processes in which such homogeneous catalyst may be effectively used.

My present process provides an effective homogeneous catalyst and an improved hydrocarbon conversion process involving the use of such catalyst. The catalyst of my present invention is anhydrous ammonium bromide. The catalyst may be mixed with the oil while the latter is in liquid phase, either with or without preheating the oil, and the oil may thereafter be heated to its cracking or reforming temperature, or the oil may be first preheated and vaporized and the catalyst admixed with the hot oil vapors.

Ammonium bromide will sublime in the presence of the oil at temperatures below the cracking temperatures of the oil and when admixed with the oil and the mixture heated to a temperature above the subliming temperature of the catalyst, the catalyst and oil may be passed together through the cracking or reforming zone as a homogeneous vapor phase.

In accordance with my present process, the homogeneous mixture of oil vapors and ammonium bromide vapors is heated to a temperature within the range of about 720° to 820° F. for a period of time sufficient to effect the desired extent of conversion. Optimum temperature and time conditions will depend primarily upon the characteristics of the particular hydrocarbon oil being processed, temperature and time being to a major extent, interdependent. In the cracking of a gas oil fraction, for instance, a temperature of about 770° F. is usually particularly advantageous.

The proportion of catalyts used is, likewise, subject to some variation depending upon the character of the oil being processed and other operating conditions. Usually proportions within the range of about 0.5 to about 5% based on the weight of the oil may be used, with advantage.

The pressure on the zone of conversion may, with advantage, be about atmospheric, or just sufficiently above atmospheric pressure to assure the passage of the mixed vapors through the conversion zone and auxiliary apparatus at the desired rate.

The effluent from the conversion zone may be fractionated in the usual manner to separate the desired fractions. Heavier, insufficiently cracked material may be recycled to the zone of conversion, either alone or in admixture with virgin charge oil, ammonium bromide being admixed therewith and the mixture subjected to cracking, as just described.

It is frequently desirable to crack the cycle stock at a somewhat higher temperature than used for the cracking of the virgin charge oil. In such operations, the cycle stock, in admixture with the catalyst, may with advantage be passed, as produced, to a separate cracking zone or may be passed to storage and subsequently rerun.

Ammonium bromide present in the effluent vapors from the conversion zone may be separated from the vapors and returned to the conversion zone with further charge oil. Such separation may, with advantage, be effected in the fractionating tower by cooling the vapor mixture to a temperature below the subliming temperature of the catalyst. The catalyst is thus solidified and separates from the oil vapors with the liquid fraction and may be returned to the cracking zone together with the heavier oil fraction, or may be separated therefrom by known means and separately returned for reuse in the conversion zone.

The conversion zone is, with advantage, a tubular or coil heater and may be preceded by a conventional pre-heating coil. The catalyst, as previously noted, may be added to the oil, either ahead of the preheater or at a point intermediate the preheater and conversion coil. Usually, cycle stock will be sufficiently hot so that it need not be passed through the preheater but may be if so desired.

The effluent from the conversion zone may, with advantage, be passed to a conventional tar separator, in which heavier fractions are separated, and the oil and catalyst vapors passed from thence to a conventional fractionating tower.

Apparatus such as just described is well-known in the art and need not be here described in greater detail.

The temperature in the tar separator is, with advantage, maintained higher than the solidifying temperature of the catalyst so as to avoid separation of the catalyst with the tar separator bottoms. By so maintaining the temperature of the tar separator, the catalyst will pass to the fractionating tower together with the oil vapors and is separated from the oil vapors in a zone of the fractionating tower wherein a temperature below the solidifying temperature of the catalyst is maintained.

In the reforming of a naphtha fraction to improve its anti-knock characteristics, the process is carried on substantially as described in conventional type apparatus.

I claim:

1. A process for cracking heavier hydrocarbons to form lighter hydrocarbons in which the heavier hydrocarbon in vapor phase and in admixture with a catalyst consisting solely of anhydrous ammonium bromide is heated to a temperature within the range of about 720 to about 820° F. at about atmospheric pressure for a period of time sufficient to effect the desired conversion.

2. A process for cracking a gas oil fraction to form lighter hydrocarbons in which the heavier hydrocarbon in vapor phase and in admixture with a catalyst consisting solely of anhydrous ammonium bromide is heated to a temperature of about 770° F. at about atmospheric pressure for a period of time sufficient to effect the desired conversion.

3. A process according to claim 1 wherein the proportion of the catalyst employed is in the range of 0.5% to 5% on the weight of the hydrocarbon.

4. A process according to claim 2 wherein the proportion of the catalyst employed is in the range of 0.5% to 5% on the weight of the gas oil fraction.

HARRY LOUIS PELZER.

REFERENCES CITED

The following references are of record in the file of this patent:

UNITED STATES PATENTS

| Number | Name | Date |
|---|---|---|
| 2,363,242 | Harvey et al. | Nov. 21, 1944 |
| 2,363,245 | Harvey et al. | Nov. 21, 1944 |

FOREIGN PATENTS

| Number | Country | Date |
|---|---|---|
| 277,974 | Great Britain | Dec. 6, 1928 |
| 279,410 | Great Britain | Dec. 6, 1928 |
| 20,279 of 1934 | Australia | Dec. 5, 1935 |